United States Patent Office 2,759,797
Patented Aug. 21, 1956

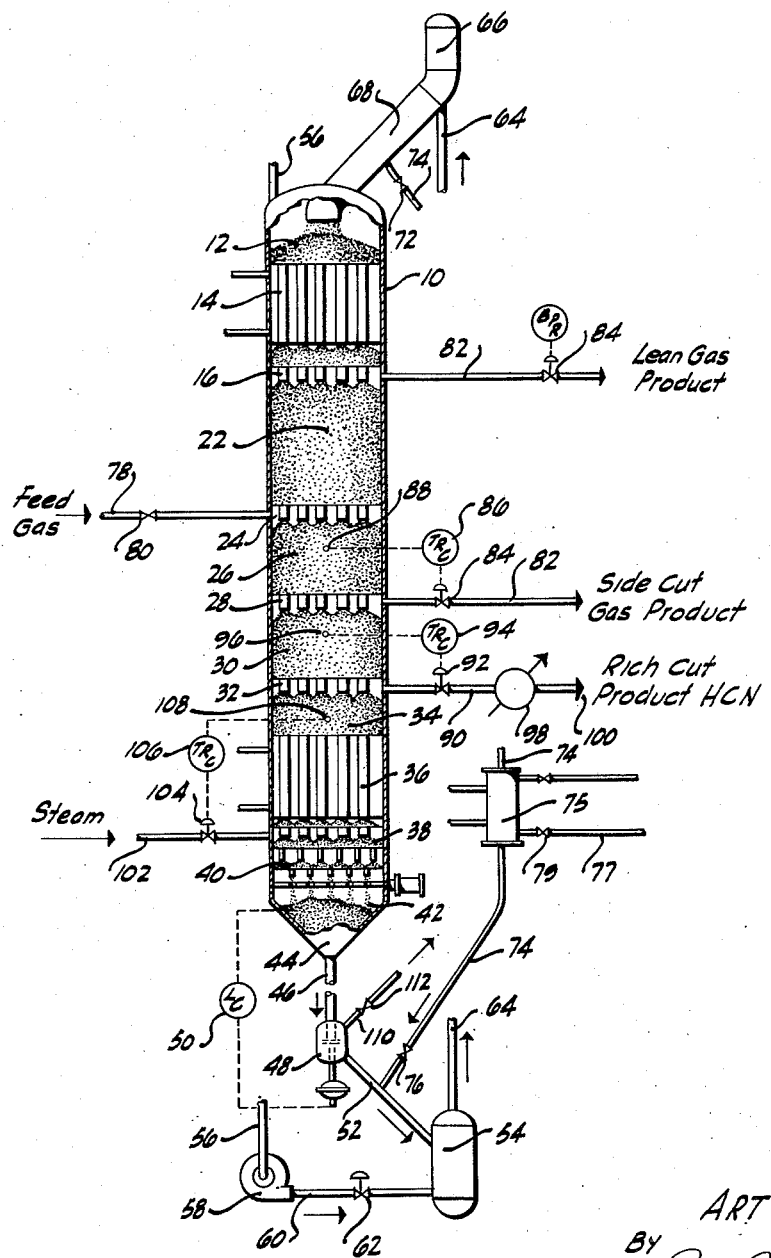

2,759,797

PROCESS FOR SEPARATING HYDROGEN CYANIDE FROM ACIDIC GASEOUS MIXTURES

Art C. McKinnis, Long Beach, Calif., assignor to Union Oil Company of California, Los Angeles, Calif., a corporation of California Application December 11, 1950, Serial No. 200,262

19 Claims. (Cl. 23—151)

This invention relates to the separation of gaseous mixtures and in particular to the separation of gaseous mixtures containing hydrogen cyanide by means of a moving bed of solid granular adsorbent.

Gaseous mixtures may be separated conventionally in a variety of well known ways including liquefaction and subsequent distillation of the condensate. However, the pressure required for liquefaction is often inordinately high and often the temperature required for liquefaction even at such high pressures is quite low. Separation of gaseous mixtures may be also accomplished by absorption in a liquid solvent. However, in many cases expensive solvents are required, solvent losses occur which are especially high when dilute gases are to be separated, the gas product is contaminated with solvent, and often high pressures and low temperatures are required.

The use of a solid granular adsorbent as a separating agent provides numerous advantages over the conventional means for gas separation. Among these are reduced operating pressures, more moderate operating temperatures compared with distillation or absorption, the elimination of a liquefaction stage, the elimination of solvent contamination in the product gases, and perhaps most important of all is the exceptional efficiency of separation obtainable when treating dilute gases, that is, gas mixtures wherein the component which is to be recovered by adsorption occurs in admixture with other gases to the extent of less than 10% of the mixture.

The characteristics of a solid granular adsorbent which make it suitable for the separation of gaseous mixtures include the property of preferential adsorption which appears as an affinity of the adsorbent for certain constituents of a gaseous mixture in preference to other constituents. Thus certain constituents are preferentially adsorbed by the adsorbent and the degree of adsorption or the preference appears in the hydrocarbon gas series to increase with the molecular weight of the constituent while in the inorganic gases there appears to be a correlation between the preferential adsorbability and the critical temperature of the constituents. Thus the hydrocarbon gases of higher molecular weight or the inorganic gases of higher critical temperature are preferentially adsorbed over those constituents having lower molecular weights or critical temperatures. Furthermore, the presence of a less readily adsorbable constituent on the adsorbent does not effect appreciably the preferential adsorption of a more readily adsorbable constituent since the former is preferentially desorbed by the preferential adsorption of the latter. The presence of the more readily adsorbable constituents on the adsorbent will decrease the adsorbability of the less readily adsorbable constituents on that adsorbent.

Applying these principles to the separation of a complex gaseous mixture, a moving bed of solid granular adsorbent is contacted with the gaseous mixture to be separated whereby the more readily adsorbable constituents are preferentially adsorbed along with small quantities of the less readily adsorbable constituents. The rich adsorbent thus formed is subsequently contacted with a reflux gas stream consisting of more readily adsorbable constituents thereby preferentially desorbing the adsorbed less readily adsorbable constituents forming a rectified adsorbent. Subsequently the rectified adsorbent, substantially free of less readily adsorbable constituents and saturated wth more readily adsorbable constituents, is treated to effect the desorption of the adsorbed materials such as by heating and stripping with a more readily adsorbable stripping gas. A gas product is formed consisting of the more readily adsorbable constituests of the gaseous mixture leaving a lean adsorbent suitable for contacting further quantities of the gaseous mixture.

It is a primary object of the present invention to provide an improved selective adsorption process for the recovery of hydrogen cyanide contained in gaseous mixtures.

It is a further object of this invention to provide an improved adsorptive process for the recovery of substantially pure hydrogen cyanide by employing an especially treated adsorbent.

Another object of this invention is to provide in an adsorptive process for hydrogen cyanide recovery an especially treated solid granular adsorbent containing a treating agent impregnated thereon which materially assists in the performance of the adsorbent to separate hydrogen cyanide from gas mixtures.

It is another object of this invention to provide an improved hydrogen cyanide recovery process in which the adsorbent is treated with specific agents to prevent adverse reactions of hydrogen cyanide while adsorbed on the adsorbent.

It is another object of the present invention to incorporate on an adsorbent in an adsorptive hydrogen cyanide recovery process small controlled quantities of stabilizing agents to prevent contamination of the adsorbent with reaction products of hydrogen cyanide and the subsequent deleterious effect on the adsorption capacity thereof.

It is a specific object of the present invention to incorporate acidic stabilizing agents having at least one hydrogen ionization constant between $5 \times 10^{-2}$ and $1 \times 10^{-8}$ in amounts less than 0.1% on a solid granular adsorbent in an adsorptive process for hydrogen cyanide recovery from gaseous mixtures thereof.

Other objects and advantages of the present invention will become apparent to those skilled in the art as the description thereof proceeds.

Briefly, the present invention comprises a continuous adsorptive process for the recovery of hydrogen cyanide from gaseous mixtures thereof in which the gaseous mixture is counter-currently contacted with a moving bed of solid granular adsorbent which has been previously treated to incorporate thereon small quantities of specific materials to stabilize the adsorbent against the deleterious effect on its adsorption capacity of the reaction products of hydrogen cyanide and simultaneously to inhibit the effect of the extended adsorbent surface area upon the reactions of hydrogen cyanide.

It has now been found that hydrogen cyanide may be successfully separated quantitatively from gaseous mixtures containing the same by contacting such a gaseous mixture with a moving bed of solid granular adsorbent, which adsorbent contains small percentages, between about 0.001% and 0.1% by weight of a stabilizing agent and inhibiting ingredient selected from the group consisting of acidic compounds having at least one hydrogen ionization constant between $5 \times 10^{-2}$ and $1 \times 10^{-8}$. This group includes such acid compounds as $H_2SO_4$, $NaHSO_4$, $H_3PO_4$, $(COOH)_2$, mono- and di-chloracetic acid, and others. Preferably $H_3PO_4$ is employed and good results are obtained with $(NH_4)H_2PO_4$. $H_2SO_4$ is effective but is not as efficient as $H_3PO_4$. The organic acids are suitable but less preferable in some instances of higher temperature stripping because of their higher volatility. The foregoing stabilizing and inhibiting agents are non-gaseous, low volatility acidc ingredients which are retained on the adsorbent in the presence of the moving streams of gases with which the adsorbent is contacted.

It has been found that an adsorbent containing such quantities of the above-named materials is stabilized against the adverse effects of polymerization and condensation reactions of hydrogen cyanide with itself and with water and at the same time inhibit such condensation and polymerization reactions. Thus a hydrogen cyanide-bearing gas either containing moisture or is substantially anhydrous may be countercurrently contacted with a moving bed of solid granular adsorbent to adsorb hydrogen cyanide therefrom leaving the less readily adsorbable constituents substantially unadsorbed. The rich adsorbent thus formed is subsequently heated and countercurrently contacted with a more readily adsorbable stripping gas to effect desorption of the hydrogen cyanide therefrom quantitatively without loss of hydrogen cyanide due to condensation or polymerization or other reactions while adsorbed on the extended surface area of the adsorbent.

The ability of the present adsorption process to separate and recover hydrogen cyanide satisfactorily in the presence of an adsorbent is of material advantage over other processes in that hydrogen cyanide frequently occurs in gaseous mixtures to the extent of less than 5% and from which it is desirable to recover. Its recovery by distillation or absorption is difficult for the aforementioned reasons and the ability of a solid adsorbent to selectively adsorb hydrogen cyanide even though in low concentration from other gaseous constituents renders the treating of dilute hydrogen cyanide gases possible, whereas, they were heretofore considered impossible to treat economically.

The process and apparatus of the present invention will be more clearly understood by reference to the accompanying drawing which shows an elevation view in cross section of an apparatus in which the process of the present invention is carried out.

Referring now more particularly to the figure, selective adsorption column 10 is provided at successively lower levels therein with hopper zone 12, lean adsorbent cooling zone 14, lean gas product disengaging zone 16, adsorption zone 22, feed gas engaging zone 24, first rectification zone 26, side cut gas product disengaging zone 28, second rectification zone 30, rich gas product hydrogen cyanide disengaging zone 32, preferential desorption zone 34, rectified adsorbent heating and stripping zone 36, stripping gas engaging zone 38, adsorbent feeder zone 40, and bottom zone 42.

The granular adsorbent introduced into hopper zone 12 passes successively through the aforementioned zones as a compact moving bed with a substantially uniform downward velocity throughout the cross sectional area of the column due to the utilization of adsorbent feeder zone 40. The granular adsorbent collects as an accumulation 44 in bottom zone 42 and is removed therefrom via sealing leg 46 at a rate controlled by solids flow control valve 48 in conjunction with level control 50. The granular solids then pass via transfer line 52 into induction zone 54. The conveyance fluid comprising a portion of the substantially unadsorbed gases is removed from hopper zone 12 via line 56 and is introduced thereby into lift gas blower 58 from which it is passed via line 60 at a rate controlled by valve 62 into induction zone 54. A suspension of granular adsorbent is formed therein which is conveyed via lift line 64 into impactless separator zone 66 wherein the suspension is separated due to the decreased lift gas velocity. The lift gas and granular solids are conveyed via transfer line 68 and are discharged into hopper zone 12 in the top of column 10. By the means just described the granular adsorbent is recirculated through zones of cooling, adsorption, rectification and desorption permitting a continuous separation of hydrogen cyanide from a gaseous mixture.

During this operation a small portion of the recirculating adsorbent withdrawn from transfer line 68 via line 70 at a rate controlled by valve 72 is passed through and indirectly heated in reactivation zone 75 to temperatures of between 500° F. and 2500° F. wherein traces of highly adsorbable and adsorbent deactivating constituents are removed or decomposed forming a reactivated adsorbent. Also the stabilizing agent is incorporated on the reactivated adsorbent via line 77 controlled by valve 79. The reactivated adsorbent is subsequently returned to the recirculating adsorbent stream via line 74 controlled by valve 76.

The gaseous mixture containing hydrogen cyanide is introduced into column 10 via line 78 at a rate controlled by valve 80 into feed gas engaging zone 24 and passes upwardly countercurrent to the down flowing adsorbent through adsorption zone 22. Herein the hydrogen cyanide in the gaseous mixture is adsorbed together with small quantities of less readily adsorbable constituents forming a rich adsorbent and leaving a lean gas containing the substantially unadsorbed constituents. This gas passes upwardly and a portion thereof is removed via line 82 at a rate controlled by valve 84 as a lean gas product from the system. The remaining portion passes upwardly through cooling zone 14 as a purge gas countercurrent to the descending adsorbent and joins the recirculating lift gas stream from which an equal amount is continuously withdrawn to avoid build up of the recirculating gas.

The rich adsorbent containing adsorbed hydrogen cyanide flows from adsorption zone 22 through first rectification zone 26 wherein the adsorbent is countercurrently contacted with a reflux flow of gaseous constituents of adsorbability intermediate between hydrogen cyanide and the less readily adsorbable constituents. A preferential desorption of the less readily adsorbable constituents is effected forming a partially rectified adsorbent containing constituents of intermedite adsorbability, hydrogen cyanide and substantially free of less readily adsorbable constituents.

The partially rectified adsorbent subsequently flows into the second rectification zone 30 wherein the adsorbent is countercurrently contacted with a reflux flow of hydrogen cyanide thereby preferentially desorbing the adsorbed constituents of intermediate adsorbability forming a rectified adsorbent. The desorbed intermediate constituents flow upwardly to side cut gas product disengaging zone 28 wherefrom a portion continues upwardly into first rectification zone 26 as reflux. The remaining portion is removed from disengaging zone 28 via line 82 at a rate controlled by valve 84 in accordance with temperature recorder controller 86 operating in conjunction with temperature sensitive means 88 such as a thermocouple. Thus as excessive quantities of reflux gas enter first rectification zone 26 the adsorbent temperature indicated by means 88 rises and controller 86 acts to open valve 84 thus increasing the proportion of side cut gas product removed and decreasing the proportion introduced into zone 26 as reflux.

The rectified adsorbent containing hydrogen cyanide passes from second rectification zone 30 into preferential desorption zone 34. Herein the rectified adsorbent is contacted countercurrently with a more readily adsorbable stripping gas thereby preferentially desorbing the major proportion of adsorbed hydrogen cyanide from the rectified adsorbent forming a partially stripped adsorbent. The desorbed hydrogen cyanide flows upwardly to disengaging zone 32 from which a portion passes into second rectification zone 30 as reflux and the residual proportion is removed via line 90 at a rate controlled by valve 92 in accordance with temperature recorder controller 94 acting in conjunction with temperature sensitive means 96. The combination of valve 92, controller 94, and means 96 cooperate to control the reflux action in second rectification zone 30 in the exact manner described in connection with a similar combination in the production of the side cut gas product. The desorbed hydrogen cyanide may or may not contain appreciable quantities of the more readily adsorbable stripping gas depending upon the type of stripping operation employed as subsequently described. The gas thus produced, however, is usually warm and is therefore passed through rich gas product cooler 98 and is sent to storage or further processing facilities not shown by means of line 100.

The partially stripped adsorbent passed from zone 34 through heating and desorption zone 36 wherein the heated adsorbent is countercurrently contacted with further quantities of the more readily adsorbable stripping gas. At the higher temperatures the residual quantities of adsorbed hydrogen cyanide are desorbed or stripped from the adsorbent and pass upwardly into rich gas disengaging zone 32. A hot lean adsorbent is removed from the bottom of adsorption column 10 and is recirculated to the top thereof to be cooled in cooler 14 and employed to contact further quantities of the gaseous mixture.

In one modification of adsorbent stripping for hydrogen cyanide recovery a more readily adsorbable stripping gas such as steam in introduced via line 102 at a rate controlled by valve 104 into stripping gas engaging zone 38. The stripping gas passes countercurrent to the downwardly flowing adsorbent successively through zones 36 and 34 and is removed via line 90 with desorbed hydrogen cyanide from disengaging zone 32. The mixture of hydrogen cyanide and steam is subsequently cooled or condensed in cooler 98 and may be sent via line 100 to storage or fractionating facilities not shown for the recovery of substantially pure hydrogen cyanide if desired.

In another modification of adsorbent stripping the hydrogen cyanide produced from disengaging zone 32 is substantially freed of stripping gas by controlling the stripping temperatures within particular limits. Valve 104 is controlled by temperature recorder controller 106 opearting in conjunction with temperature sensitive means 108. The maximum temperature to which the partially stripped adsorbent is heated in zone 36 is maintained above the value given by the equation below so that a substantially complete desorption of stripping gas from the adsorbent occurs in the lower portions of the heating zone. The thus desorbed stripping gas passes upwardly into preferential desorption zone 34 wherein the temperature is maintained at least about 200° F. below the value given by the equation referred to. The stripping gas is preferentially adsorbed on the cooler adsorbent preferentially desorbing the adsorbed hydrogen cyanide as a rich gas product. The adsorbed stripping gas returns to the heating zone with the downwardly flowing adsorbent and is subsequently redesorbed. Thus an internal recycle of stripping gas is maintained in the absence of a substantial throughput of stripping gas and the hydrogen cyanide product is substantially free of stripping gas. Temperature sensitive means 108 detects changes in the quantity of the thus recirculating stripping gas and causes valve 104 to open when additional quantities of stripping gas are needed to maintain the internal recycle.

When activated charcoal is employed as the adsorbent stripping steam may be entirely desorbed from the charcoal by maintaining a maximum temperature in stripping zone 36 which is equal to or greater than the temperature T° F. given by the following equation:

$$T° F. = 175 P^{0.191}$$

wherein P is pressure in pounds per square inch absolute. Other adsorbents act similarly. Either of the two foregoing adsorbent stripping operations for hydrogen cyanide recovery from the adsorbent may be employed.

Part of the stripping gas in either modification of adsorbent stripping passes downwardly from engaging zone 38 through sealing leg 46 to solids flow control valve 48. Simultaneously part of the lift gas passes upwardly through transfer line 52 into the solids flow control valve chamber. The combined streams of the two mentioned gases are removed from valve chamber 48 via line 110 controlled by valve 112 as a seal gas stream which prevents lift gas contamination of the rich gas product and the entry of stripping gas into the recirculating lift gas stream.

As examples of the process of the present invention the following data are given:

*Example I*

Unstabilized activated coconut charcoal having an adsorption capacity of 0.43 pound of hydrogen cyanide per pound of charcoal is saturated at atmospheric pressure with a gas containing 2.5% of hydrogen cyanide and subsequently heated in a closed vessel to a temperature of 100° C. for a period of 90 minutes. Upon stripping desorbable constituents with steam at 110° C. and cooling the thus treated charcoal the adsorption capacity of the charcoal is decreased to 0.41 pound of hydrogen cyanide per pound of charcoal. This constitutes a 4.7% decrease in adsorption capacity due to adverse effect hydrogen cyanide reactions at elevated temperatures in the pores of the adsorbent. Repeated adsorptions and desorptions soon destroy the effectiveness of the adsorbent for HCN adsorption.

*Example II*

The same type of activated charcoal as employed in Example I is saturated at atmospheric pressure with a gas containing 2.5% of hydrogen cyanide and 3.0% moisture. The adsorbent is heated for a period of 180 minutes at a temperature of 100° C. After steam stripping desorbable constituents at 110° C. and cooling, the adsorbent is found to have an adsorption capacity for hydrogen cyanide of 0.38 pound per pound of charcoal. This indicates a 11.7% decrease in adsorption capacity due to the adverse effect of hydrogen cyanide reactions in the presence of moisture at these temperatures. The adsorbent is more quickly made ineffective than in Example I.

*Example III*

An activated charcoal similar to the charcoal employed in Examples I and II is impregnated with 0.05% by weight of $H_3PO_4$. This charcoal is dried and saturated with a gas containing hydrogen cyanide. The saturated adsorbent is heated to a temperature of 100° C. for two hours in a closed vessel and subsequently cooled. The adsorbed quantity of hydrogen cyanide is recoverable quantitatively and the adsorptive capacity of the adsorbent is unchanged.

*Example IV*

The activated charcoal stabilized according to the procedure of Example III is saturated with a mixture of hydrogen cyanide and water vapor. The saturated adsorbent is heated for a period of 240 minutes at a temperature of 100° C. in a closed vessel and subsequently cooled. The adsorbed hydrogen cyanide is recoverable quantitatively and the adsorpative capacity of the adsorbent remains the same.

*Example V*

An activated charcoal is impregnated by means of an aqueous solution with 0.05% by weight of $(NH_4)H_2PO_4$. The charcoal is dried and saturated with a gaseous mixture of hydrogen cyanide and water vapor. The adsorbent after being subjected to the same heating and cooling treatment as in Example IV is found to have unimpaired adsorption characteristics.

Example VI

The impregnation of the charcoal with 0.08% $H_2SO_4$ gives substantially the same effective stabilization.

Example VII

Charcoal impregnated with 0.10% $NaHSO_4$ suitably stabilizes it against the action of hydrogen cyanide.

Example VIII

An activated charcoal impregnated with 0.06% by weight of oxalic acid $(COOH)_2$ by means of an aqueous solution adequately stabilizes the adsorbent in the presence of hydrogen cyanide.

Example IX

An activated charcoal impregnated with 0.07% by weight of dichloracetic acid by means of an aqueous solution adequately stabilizes the adsorbent in the presence of hydrogen cyanide.

Example X

A typical effluent gas from a partial oxidation process for producing hydrogen cyanide has the following composition:

| Component: | Volume percent |
|---|---|
| $N_2$ | 55.5 |
| $H_2$ | 16.5 |
| CO | 9.9 |
| $H_2O$ | 11.8 |
| HCN | 2.8 |
| $CH_4$ | 1.44 |
| $C_2H_2$ | 0.44 |
| $C_2H_4$ | 0.27 |
| $CO_2$ | 0.72 |
| A | 0.63 |
| | 100.00 |

In applying the process of the present invention to hydrogen cyanide recovery, the gaseous mixture is contacted at atmospheric pressure with 75 pounds of stabilized charcoal per MSCF (thousand standard cubic feet) of gas forming a rich charcoal. By refluxing the adsorbent with hydrogen cyanide a side cut gas product is produced by desorption at a rate of about 30 standard cubic feet per MSCF of feed and containing about 50% methane, 25% $C_2$ hydrocarbons and 25% carbon dioxide. A rich gas product consisting of substantially pure hydrogen cyanide is desorbed from the rectified adsorbent at a rate of about 29 standard cubic feet per MSCF of feed gas and the lean adsorbent is recirculated for re-use. A stripping temperature of about 450° F. to 500° F. is employed with steam as stripping gas.

Other adsorbents which may be impregnated to achieve the foregoing results in the adsorptive separation of hydrogen cyanide include such materials as silica gel and the activated aluminum oxide adsorbents made by precipitation of aluminum hydroxide, or by the activation of natural materials as bauxite.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for separating hydrogen cyanide from acidic gaseous mixtures thereof which comprises contacting the gaseous mixture with a stabilized granular adsorbent pretreated to contain between 0.001% and 0.1% by weight of a non-gaseous, low volatility acidic stabilizer having at least one hydrogen ionization constant between $5 \times 10^{-2}$ and $1 \times 10^{-8}$ to form a hydrogen cyanide-containing rich adsorbent, and subsequently desorbing substantially pure hydrogen cyanide from said adsorbent.

2. A process for separating hydrogen cyanide from acidic gaseous mixtures thereof which comprises contacting said gaseous mixture with a stabilized granular adsorbent pretreated to contain between 0.001% and 0.1% by weight of a non-gaseous, low volatility acidic stabilizing agent having at least one hydrogen ionization constant between $5 \times 10^{-2}$ and $1 \times 10^{-8}$ forming a rich adsorbent containing adsorbed hydrogen cyanide, subsequently heating said adsorbent in direct contact with a flow of stripping gas thereby desorbing said hydrogen cyanide, leaving a lean adsorbent, and returning said lean adsorbent to contact further quantities of said gaseous mixture.

3. A process according to claim 2 wherein said rich adsorbent is indirectly heated in a desorption zone and simultaneously directly contacted with a countercurrent flow of steam as said stripping gas to desorb said hydrogen cyanide.

4. A process according to claim 3 wherein said adsorbent is activated charcoal in combination with the step of maintaining the temperature of the charcoal entering said desorption zone about 200° F. below T° F. and heating the charcoal within said desorption zone to a temperature above T° F. as given by:

$$T° F. = 175 \, P^{0.191}$$

wherein P is the desorption zone pressure in pounds per square inch absolute, to establish an internal steam recycle within said desorption zone.

5. A process for separating hydrogen cyanide from acidic gaseous mixtures thereof which comprises passing a moving bed of solid stabilized granular adsorbent successively through an adsorption zone and a desorption zone, passing said gaseous mixture through said adsorption zone in countercurrent contact with said adsorbent, subsequently indirectly heating said adsorbent, directly contacting the heated adsorbent with steam thereby desorbing adsorbed hydrogen cyanide as a rich gas product therefrom leaving a lean adsorbent, and maintaining between 0.001% and 0.1% by weight of a non-gaseous, low volatility acidic stabilizing agent having at least one hydrogen ionization constant between $5 \times 10^{-2}$ and $1 \times 10^{-8}$ adsorbed on said adsorbent.

6. A process for separation of hydrogen cyanide from acidic gaseous mixtures thereof which comprises passing a moving bed of solid stabilized granular adsorbent successively through an adsorption zone and a desorption zone, passing said gaseous mixture through said adsorption zone in countercurrent contact with said adsorbent, subsequently indirectly heating said adsorbent, directly contacting the heated adsorbent with steam thereby desorbing adsorbed hydrogen cyanide as a rich gas product therefrom leaving a lean adsorbent, and maintaining between 0.001% and 0.1% by weight of an acidic stabilizing agent selected from the group consisting of $H_3PO_4$, $H_2SO_4$, $NaHSO_4$, $(NH_4H_2PO_4)$, oxalic acid, monochloracetic acid, and dichloroacetic acid.

7. A process according to claim 6 wherein said gaseous mixture also contains water vapor.

8. In a process for the separation of adsorbable constituents from gaseous mixtures thereof which comprises contacting the gaseous mixture with a solid stabilized granular adsorbent to form a rich adsorbent containing said adsorbable constituents and subsequently heating said rich adsorbent to desorb said adsorbed constituents, the improvement when said adsorbable constituents include hydrogen cyanide in an acidic gaseous mixture which comprises employing an adsorbent previously impregnated with between 0.001% and 0.1% by weight of a non-gaseous, low volatility acidic stabilizing agent having at least one hydrogen ionization constant of between $5 \times 10^{-2}$ and $1 \times 10^{-8}$.

9. A process according to claim 8 wherein said acidic stabilizing agent is selected from the group consisting of phosphoric acid, sulfuric acid, sodium acid sulfate, ammonium dihydrogen phosphate, monochloracetic acid, dichloracetic acid and oxalic acid.

10. In the separation of hydrogen cyanide from acidic gaseous mixtures thereof which comprises recirculating a moving bed of solid, stabilized granular adsorbent through an adsorption zone and a desorption zone, contacting said adsorbent in said adsorption zone with said gaseous mixture forming a rich adsorbent containing adsorbed hydrogen cyanide, subsequently heating said rich adsorbent in said desorption zone while directly contacting the heated adsorbent with a stripping gas forming a substantially pure stream of desorbed hydrogen cyanide and a lean adsorbent, and returning the lean adsorbent to said adsorption zone, the improvement which comprises maintaining between 0.001% and 0.1% by weight of an adsorbent stabilizing agent selected from the group consisting of phosphoric acid, sulfuric acid, sodium acid sulfate, ammonium dihydrogen phosphate, monochloracetic acid, dichloracetic acid and oxalic acid adsorbed on said recirculating adsorbent.

11. A process according to claim 10 wherein said gaseous mixture contains hydrogen cyanide in the presence of water vapor.

12. A process according to claim 10 in combination with the steps of removing a side stream from the recirculating adsorbent stream prior to entrance into said adsorption zone, heating said adsorbent to between 500° F. and 2500° F., contacting the heated adsorbent with a reactivating gas forming a reactivated adsorbent, reimpregnating said reactivated adsorbent with said stabilizing agent, and combining this adsorbent with that removed from said desorption zone.

13. A process for separation of hydrogen cyanide from acidic gaseous mixtures thereof which comprises recirculating a moving bed of solid stabilized granular adsorbent through an adsorption zone and a desorption zone, contacting said adsorbent in said adsorption zone with said gaseous mixture forming a rich adsorbent containing adsorbed hydrogen cyanide, subsequently heating said rich adsorbent in said desorption zone while directly contacting the heated adsorbent with a countercurrent flow of steam to desorb adsorbed hydrogen cyanide leaving a lean adsorbent, returning the lean adsorbent to said adsorption zone, and maintaining between 0.001% and 0.1% by weight of phosphoric acid ($H_3PO_4$) adsorbed on the recirculating adsorbent to stabilize hydrogen cyanide adsorbed thereon.

14. A process for separation of hydrogen cyanide from acidic gaseous mixtures thereof which comprises recirculating a moving bed of solid stabilized granular adsorbent through an adsorption zone and a desorption zone, contacting said adsorbent in said adsorption zone with said gaseous mixture forming a rich adsorbent containing adsorbed hydrogen cyanide, subsequently heating said rich adsorbent in said desorption zone while directly contacting the heated adsorbent with a countercurrent flow of steam to desorb adsorbed hydrogen cyanide leaving a lean adsorbent, returning the lean adsorbent to said adsorption zone, and maintaining between 0.001% and 0.1% by weight of sulfuric acid adsorbed on the recirculating adsorbent to stabilize adsorbed hydrogen cyanide adsorbed thereon.

15. A process according to claim 14 in which the solid adsorbent is activated charcoal.

16. A process for separation of hydrogen cyanide from acidic gaseous mixtures thereof which comprises recirculating a moving bed of solid stabilized granular adsorbent through an adsorption zone and a desorption zone, contacting said adsorbent in said adsorption zone with said gaseous mixture forming a rich adsorbent containing adsorbed hydrogen cyanide, subsequently heating said rich adsorbent in said desorption zone while directly contacting the heated adsorbent with a countercurrent flow of steam to desorb adsorbed hydrogen cyanide leaving a lean adsorbent, returning the lean adsorbent to said adsorption zone, and maintaining between 0.001% and 0.1% by weight of ammonium dihydrogen phosphate adsorbed on the recirculating adsorbent to stabilize adsorbed hydrogen cyanide adsorbed thereon.

17. A process according to claim 16 in which the solid adsorbent is activated charcoal.

18. A process for separation of hydrogen cyanide from acidic gaseous mixtures thereof which comprises recirculating a moving bed of solid stabilized granular adsorbent through an adsorption zone and a desorption zone, contacting said adsorbent in said adsorption zone with said gaseous mixture forming a rich adsorbent containing adsorbed hydrogen cyanide, subsequently heating said rich adsorbent in said desorption zone while directly contacting the heated adsorbent with a countercurrent flow of steam to desorb adsorbed hydrogen cyanide leaving a lean adsorbent, returning the lead adsorbent to said adsorption zone, and maintaining between 0.001% and 0.1% by weight of a chloracetic acid having at least one hydrogen ionization constant between $5 \times 10^{-2}$ and $1 \times 10^{-8}$ adsorbed on the recirculating adsorbent to stabilize adsorbed hydrogen cyanide adsorbed thereon, 19. A process for separation of hydrogen cyanide from acidic gaseous mixtures thereof which comprises recirculating a moving bed of solid stabilized granular adsorbent through an adsorption zone and a desorption zone, contacting said adsorbent in said adsorption zone with said gaseous mixture forming a rich adsorbent containing adsorbed hydrogen cyanide, subsequently heating said rich adsorbent in said desorption zone while directly contacting the heated adsorbent with a countercurrent flow of steam to desorb adsorbed hydrogen cyanide leaving a lean adsorbent, returning the lean adsorbent to said adsorption zone, and maintaining between 0.001% and 0.1% by weight of oxalic acid adsorbed on the recirculating adsorbent to stabilize adsorbed hydrogen cyanide adsorbed thereon.

References Cited in the file of this patent

UNITED STATES PATENTS

| | | |
|---|---|---|
| 2,493,911 | Brandt | Jan. 10, 1950 |
| 2,495,842 | Gilliland | Jan. 31, 1950 |
| 2,545,067 | Berg et al. | Mar. 13, 1951 |
| 2,545,850 | Imhoff | Mar. 20, 1951 |
| 2,596,421 | McKinnis | May 13, 1952 |

FOREIGN PATENTS

| | | |
|---|---|---|
| 254,747 | Great Britain | July 6, 1926 |
| 271,236 | Great Britain | May 26, 1927 |
| 447,913 | Germany | Aug. 4, 1927 |

OTHER REFERENCES

Natural Gas, November 1924, pages 3, 4, 46, 48, 54 and 56.